US010621169B2

(12) United States Patent
Rana et al.

(10) Patent No.: US 10,621,169 B2
(45) Date of Patent: Apr. 14, 2020

(54) METHOD AND SYSTEM FOR MAINTAINING KNOWLEDGE REQUIRED IN A DECISION-MAKING PROCESS FRAMEWORK

(71) Applicant: Diwo, LLC, Northville, MI (US)

(72) Inventors: Satyendra Pal Rana, Northville, MI (US); Chandra Puttanna Keerthy, Northville, MI (US); Krishna Prakash Kallakuri, Northville, MI (US)

(73) Assignee: DIWO, LLC, Northville, MI (US)

(*) Notice: Subject to any disclaimer, the term of this patent is extended or adjusted under 35 U.S.C. 154(b) by 124 days.

(21) Appl. No.: 15/788,254

(22) Filed: Oct. 19, 2017

(65) Prior Publication Data
US 2018/0113903 A1    Apr. 26, 2018

Related U.S. Application Data

(60) Provisional application No. 62/410,791, filed on Oct. 20, 2016.

(51) Int. Cl.
*G06F 16/00* (2019.01)
*G06F 16/2453* (2019.01)
(Continued)

(52) U.S. Cl.
CPC ........ *G06F 16/24535* (2019.01); *G06F 16/14* (2019.01); *G06F 16/367* (2019.01); *G06N 5/003* (2013.01); *G06N 5/022* (2013.01)

(58) Field of Classification Search
CPC ...... G06F 16/958; G06F 16/334; G06F 16/14; G06F 16/24535; G06F 16/24575;
(Continued)

(56) References Cited

U.S. PATENT DOCUMENTS 6,901,410 B2 * 5/2005 Marron ................. G06F 16/93
7,024,414 B2 * 4/2006 Sah ...................... G06F 16/284
(Continued)

OTHER PUBLICATIONS

Apex Data and Knowledge Management Lab, Department of Computer Science and Engineering, Shanghai Jiao Tong University and IBM China Research Lab "Minerva: A Scalable OWL Ontology Storage and Inference System", 2006.

*Primary Examiner* — Merilyn P Nguyen
(74) *Attorney, Agent, or Firm* — FisherBroyles, LLP; Susan M. Oiler

(57) ABSTRACT

Disclosed is a knowledge system for retrieving a knowledge object, pertaining to a query, in a cognitive decision-making process. The knowledge system comprises a knowledge access module and a knowledge processing module. The knowledge access module may receive a knowledge request requesting a knowledge object. In one aspect, the knowledge request may be associated to at least one domain. The knowledge access further generates a structured query based on the knowledge request. The knowledge access module further splits the structured query into one or more sub queries. In one aspect, the structured query may be split based on the at least one domain and metadata associated to the at least one domain. The knowledge access module further fetches one or more knowledge objects for each sub query upon executing the one or more sub queries on a system database storing a plurality of knowledge objects. In one aspect, the one or more knowledge objects may be fetched upon referring to one or more ontologies stored in the system database. The knowledge processing module creates and thereby stores an integrated knowledge object for the knowledge request upon integrating the one or more knowledge objects fetched by the one or more sub queries.

11 Claims, 3 Drawing Sheets

(51) Int. Cl.
*G06N 5/00* (2006.01)
*G06F 16/14* (2019.01)
*G06F 16/36* (2019.01)
*G06N 5/02* (2006.01)

(58) Field of Classification Search
CPC .... G06F 16/3338; G06F 16/36; G06F 16/367; G06F 16/38; G06N 5/02; G06N 5/003; G06N 5/022
See application file for complete search history.

(56) References Cited

U.S. PATENT DOCUMENTS

| | | | |
|---|---|---|---|
| 7,693,812 B2 | 4/2010 | Lim et al. | |
| 8,386,508 B2* | 2/2013 | Krishnamoorthy | G06F 16/24532 707/764 |
| 8,745,066 B2* | 6/2014 | Zenger | G06Q 10/063 707/748 |
| 8,838,659 B2* | 9/2014 | Tunstall-Pedoe | G06N 5/02 707/899 |
| 9,720,984 B2 | 8/2017 | McClung et al. | |
| 10,116,725 B2* | 10/2018 | Wells | G06F 9/5033 |
| 2002/0198891 A1* | 12/2002 | Li | G06F 16/289 |
| 2004/0243595 A1* | 12/2004 | Cui | G06F 16/2471 |
| 2006/0206477 A1* | 9/2006 | Dalvi | G06F 16/2468 |
| 2010/0070448 A1* | 3/2010 | Omoigui | H01L 27/1463 706/47 |
| 2010/0228693 A1* | 9/2010 | Dawson | G06F 17/2705 706/12 |
| 2012/0078888 A1* | 3/2012 | Brown | G06F 16/3329 707/723 |
| 2016/0224645 A1* | 8/2016 | Dang | G06F 16/86 |

\* cited by examiner

METHOD AND SYSTEM FOR MAINTAINING KNOWLEDGE REQUIRED IN A DECISION-MAKING PROCESS FRAMEWORK

CROSS REFERENCE TO RELATED APPLICATIONS

This patent application claims priority from U.S. Provisional Application No. 62/410,791 filed on Oct. 20, 2016, the entirety of which is hereby incorporated by reference.

TECHNICAL FIELD

The present disclosure described herein, in general, relates to maintain knowledge required in a decision-making process framework.

BACKGROUND

It has been proven that providing relevant knowledge at the right time may play a significant role in optimizing the performance of a business. In an era of Information Technology (IT), vast amount of knowledge may be electronically accessible from knowledge management systems via a computer network. However, such knowledge management systems have proven inadequate in providing the relevant knowledge. This is due to the fact that traditional knowledge management systems mostly rely on a query derived by a human. As a result of which the query may result into irrelevant knowledge as such query is derived without considering contextual and conceptual parameters associated to the business.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for retrieving a knowledge object, pertaining to a query, in a cognitive decision-making process and the concepts are further described below in the detailed description. This summary is not intended to identify essential features of the claimed subject matter nor is it intended for use in determining or limiting the scope of the claimed subject matter.

In one implementation, a knowledge system for retrieving a knowledge object, pertaining to a query, in a cognitive decision-making process is disclosed. The knowledge system comprises a processor and a memory coupled to the processor. The processor is capable of executing a plurality of modules stored in the memory. The knowledge system comprises a knowledge access module and a knowledge processing module. The knowledge access module may receive a knowledge request requesting a knowledge object. In one aspect, the knowledge request may be associated to at least one domain. It may be noted that the knowledge request may be received from a user. The knowledge access module may further generate a structured query based on the knowledge request. The knowledge access module may further split the structured query into one or more sub queries. In one aspect, the structured query may be split based on the at least one domain and metadata associated to the at least one domain. The knowledge access module may further fetch one or more knowledge objects for each sub query upon executing the one or more sub queries on a system database storing a plurality of knowledge objects. In one aspect, the one or more knowledge objects may be fetched upon referring to one or more ontologies stored in the system database. The knowledge processing module may create an integrated knowledge object for the knowledge request upon integrating the one or more knowledge objects fetched by the one or more sub queries. The knowledge processing module may further store the integrated knowledge object, along with the one or more ontologies, in a temporary memory for the user's reference thereby retrieving the knowledge object pertaining to the query.

In another implementation, a method for retrieving a knowledge object, pertaining to a query, in a cognitive decision-making process is disclosed. In order to retrieve the knowledge object, a knowledge request requesting a knowledge object may be received from a user. In one aspect, the knowledge request may be associated to at least one domain. Upon receipt of the knowledge request, a structured query may be generated based on the knowledge request. Subsequently, the structured query may be split into one or more sub queries. In one aspect, the structured query may be split based on the at least one domain and metadata associated to the at least one domain. Post splitting of the structured query, one or more knowledge objects may be fetched for each sub query upon executing the one or more sub queries on a system database storing a plurality of knowledge objects. In one aspect, the one or more knowledge objects may be fetched upon referring to one or more ontologies stored in the system database. After fetching the one or more knowledge objects, an integrated knowledge object may be created for the knowledge request upon integrating the one or more knowledge objects fetched by the one or more sub queries. Thereafter, the integrated knowledge object, along with the one or more ontologies, may be stored in a temporary memory for the user's reference thereby retrieving the knowledge object pertaining to the query. In one aspect, the aforementioned method for retrieving the knowledge object may be performed by a processor using programmed instructions stored in a memory of the knowledge system.

In yet another implementation, a non-transitory computer readable medium embodying a program executable in a computing device for retrieving a knowledge object, pertaining to a query, in a cognitive decision-making process is disclosed. The program may comprise a program code for receiving a knowledge request requesting a knowledge object, wherein the knowledge request is associated to at least one domain, and wherein the knowledge request is received from a user. The program may further comprise a program code for generating, by the processor, a structured query based on the knowledge request. The program may further comprise a program code for splitting the structured query into one or more sub queries, wherein the structured query is split based on the at least one domain and metadata associated to the at least one domain. The program may further comprise a program code for fetching one or more knowledge objects for each sub query upon executing the one or more sub queries on a system database storing a plurality of knowledge objects, wherein the one or more knowledge objects are fetched upon referring to one or more ontologies stored in the system database. The program may further comprise a program code for creating an integrated knowledge object for the knowledge request upon integrating the one or more knowledge objects fetched by the one or more sub queries. The program may further comprise a program code for storing the integrated knowledge object, along with the one or more ontologies, in a temporary memory for the user's reference thereby retrieving the knowledge object pertaining to the query.

BRIEF DESCRIPTION OF THE DRAWINGS

The foregoing detailed description of embodiments is better understood when read in conjunction with the appended drawing. For the purpose of illustrating the disclosure, there is shown in the present document example constructions of the disclosure; however, the disclosure is not limited to the specific methods and apparatus disclosed in the document and the drawings.

The detailed description is described with reference to the accompanying figure. In the figure, the left-most digit(s) of a reference number identifies the figure in which the reference number first appears. The same numbers are used throughout the drawings to refer like features and components.

Figure 1:
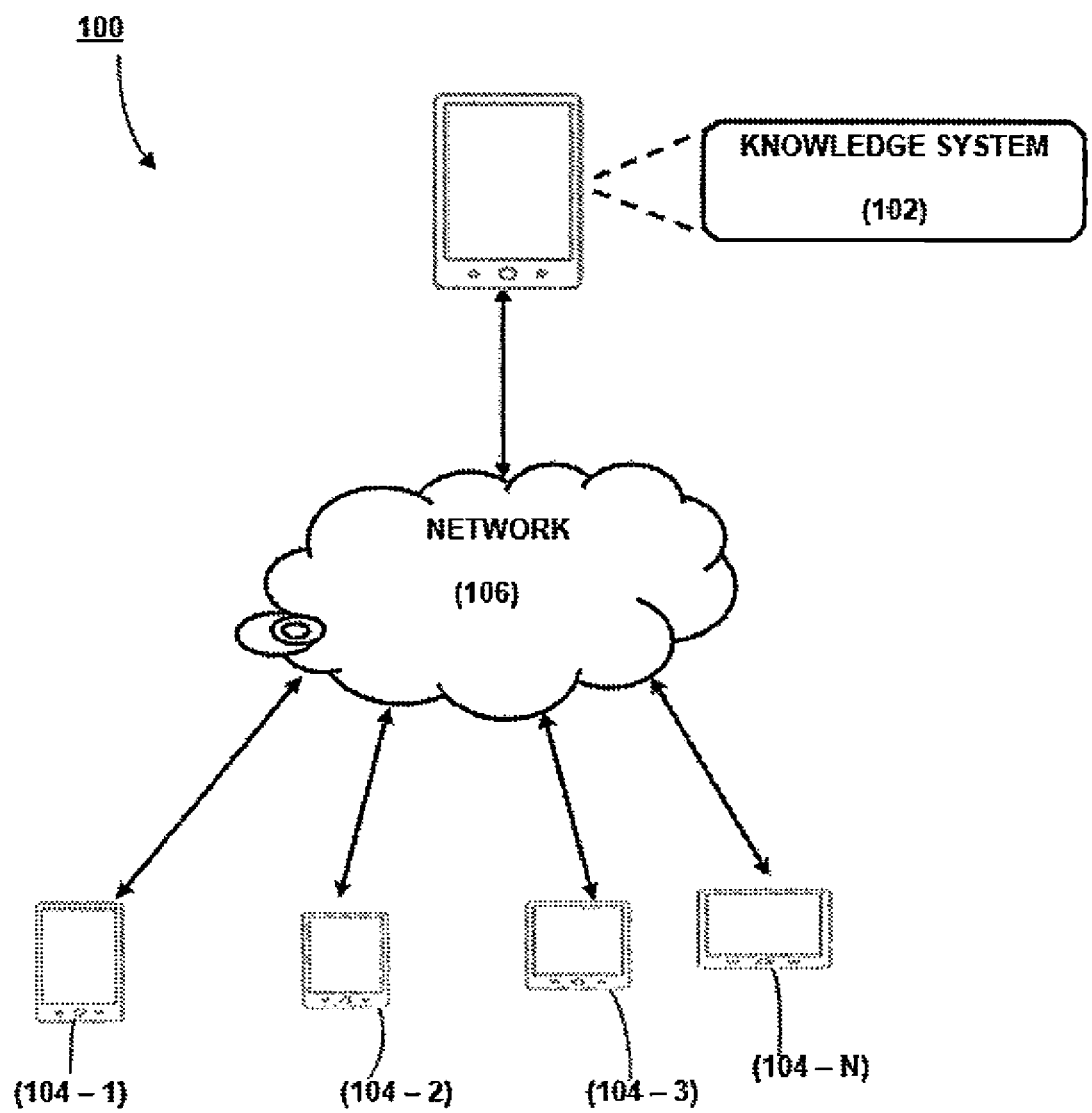
FIG. 1 illustrates a network implementation of a knowledge system for retrieving a knowledge object in a decision-making process framework is shown, in accordance with an embodiment of the present disclosure.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that, the singular forms "a," "an," and "the" include plural references unless the context clearly dictates otherwise. Although any apparatuses and methods similar or equivalent to those described herein can be used in the practice or testing of embodiments of the present disclosure, the exemplary, apparatuses and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Optimization in business processes is necessitated for scaling up a business. In order to optimize a business performance, a cognitive system continually senses for new signals and reacts promptly when such signals indicate a brewing business situation of interest hereinafter referred to as an 'Opportunity'. This is to signify that, for each opportunity, the business performance is optimized by mitigating risk and/or by seizing a growth prospect. The extent to and the dexterity by which the business may sense and react to the opportunity indicates capability for continuous optimization of the business performance.

It may be noted that an opportunity driven organization optimizes the business performance by using a cognitive decision-making process by sensing and reacting to the opportunity. The cognitive decision-making process comprises four phases including 'SENSE', 'EXPLORE', 'ACT', and 'LEARN'. Each opportunity instance originates in the SENSE phase, moves on to EXPLORE, then onto ACT phase, and finally closes in the LEARN phase. However, to sense and thereby reacts to the opportunity, it becomes utmost important to provide relevant knowledge, pertaining to the opportunity, so that the opportunity driven organization may take corrective measures for the opportunity.

The present invention facilitates to retrieve a knowledge object in the cognitive decision-making process is disclosed. In other words, the present invention maintains a knowledge base comprising a plurality of knowledge objects (i.e. all declarative and procedural knowledge) and thereby retrieves a knowledge object relevant for the business opportunity for optimizing the business performance. Examples of the knowledge object may include, but not limited to, a document, a web page, a video, and an image. In one aspect, the knowledge object, stored in a knowledge system, may be retrieved to draw inferences and thereby provided to the SEAL framework in order to assist a user in taking necessary decisions based on the inferences drawn from the knowledge object.

In one aspect, the knowledge object may be stored, in the knowledge system, corresponding to one or more ontologies. It may be noted that the one or more ontologies store knowledge about opportunity types, opportunity instances, users, system configuration, and parameters and hyper-parameters of analytic methods. Examples of the one or more ontologies may include, but not limited to, perceptual system ontology, domain opportunity ontology, cognitive decision-making process ontology, domain knowledge ontology, and Human Interaction System ontology.

In order to retrieve the knowledge object in the cognitive decision-making process (SEAL), the knowledge system receives a request from a user. The request may be associated to at least one domain. The request may then be used to generate a structured query. The knowledge system further pre-processes (for example, check if well-formed) the structured query, if necessary, before executing on a knowledge database stored in the knowledge system. Upon execution of the query, the knowledge system fetches the knowledge object and further display the knowledge object to the user. The knowledge object may then be used to deduce inferences/insights obtained and taking the corrective measures for the business opportunity.

Thus, in this manner, the knowledge system retrieves the knowledge object in the cognitive decision-making process. While aspects of described system and method for retrieving the knowledge object may be implemented in any number of different computing systems, environments, and/or configurations, the embodiments are described in the context of the following exemplary system.

Referring now to FIG. 1, a network implementation 100 of a knowledge system 102 for retrieving a knowledge object, pertaining to a query, in a cognitive decision-making process is disclosed. In order to retrieve the knowledge object, the knowledge system 102 receives a knowledge request requesting a knowledge object from a user. Upon receipt of the knowledge request, the knowledge system 102 generates a structured query based on the knowledge request. Subsequently, knowledge system 102 splits the structured query into one or more sub queries. In one aspect, the structured query may be split based on the at least one domain and metadata associated to the at least one domain. Post splitting of the structured query, the knowledge system 102 fetches one or more knowledge objects for each sub query upon executing the one or more sub queries on a system database storing a plurality of knowledge objects. In one aspect, the one or more knowledge objects may be fetched upon referring to one or more ontologies stored in the system database. After fetching the one or more knowledge objects, the knowledge system 102 creates an integrated knowledge object for the knowledge request upon integrating the one or more knowledge objects fetched by the one or more sub queries. Thereafter, the knowledge system 102 stores the integrated knowledge object, along with the one or more ontologies, in a temporary memory for the user's reference thereby retrieving the knowledge object pertaining to the query.

Although the present disclosure is explained considering that the knowledge system 102 is implemented on a single server, it may be understood that the knowledge system 102 may also be implemented in a Distributed Computing Environment (DCE), involving variety of computing systems operating in parallel. Examples of the computing systems may include, but not limited to, a laptop computer, a desktop computer, a notebook, a workstation, a mainframe computer, a server, a network server, and the like. It will be understood that the knowledge system 102 may be accessed by multiple users through one or more user devices 104-1, 104-2, 104-3; 104-N. In one implementation, the knowledge system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the knowledge system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
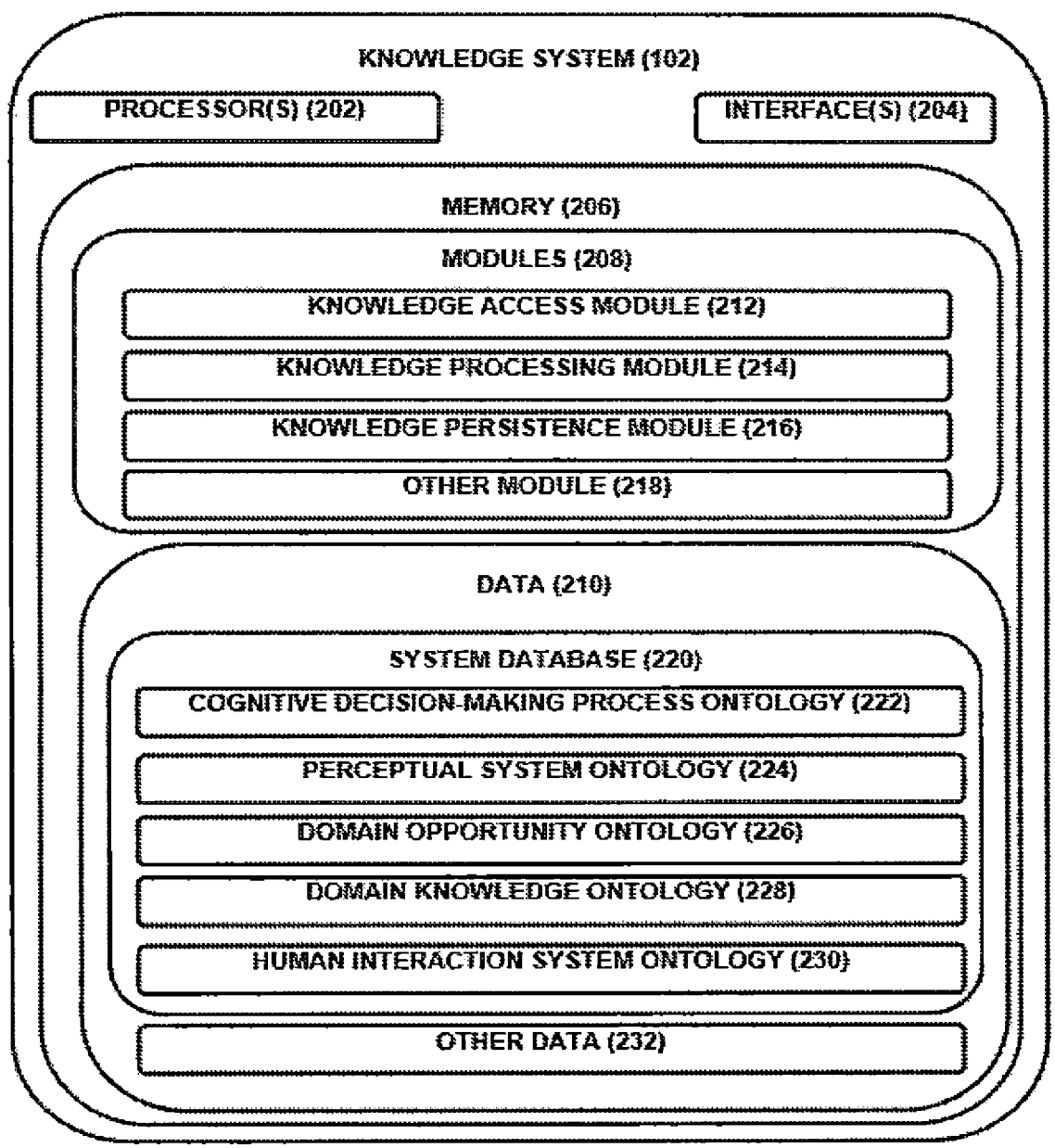
FIG. 2 illustrates the knowledge system, in accordance with an embodiment of the present disclosure.

Referring now to FIG. 2, the knowledge system 102 is illustrated in accordance with an embodiment of the present subject matter. In one embodiment, the Knowledge system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the knowledge system 102 to interact with the user directly or through the user devices 104. Further, the I/O interface 204 may enable the knowledge system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a knowledge access module 212, a knowledge processing module 214, a knowledge persistence module 216, and other modules 218. The other modules 218 may include programs or coded instructions that supplement applications and functions of the knowledge system 102. The modules 208 described herein may be implemented as software modules that may be executed in the cloud-based computing environment of the knowledge system 102.

The data 210, amongst other things, serves as a repository for storing a plurality of knowledge objects. It may be noted that the data 210 may include a system database 220 present within the knowledge system 102 and an external database (not shown) communicative coupled, via the network 106, with the knowledge system 102. The system database 220 further comprises one or more ontologies storing a set of predefined rules facilitating fetching of a knowledge object relevant for a query. The one or more ontologies including a cognitive decision-making process ontology 222, a perceptual system ontology 224, a domain opportunity ontology 226, a domain knowledge ontology 228, a human interaction system ontology 230, and other data 232. The other data 232 may include data generated as a result of the execution of one or more modules in the other modules 218. The detailed description of the modules 208 along with other components of the knowledge system 102 is further explained by referring to FIG. 2.

Further referring to the FIG. 2. The knowledge system 102 retrieves a knowledge object in the cognitive decision-making process is disclosed. In other words, the present invention maintains a knowledge database comprising a plurality of knowledge objects (i.e. all declarative and procedural knowledge) and thereby retrieves a knowledge object relevant for the business opportunity for optimizing the business performance. Examples of the knowledge object may include, but not limited to, a document, a web page, a video, and an image. In one aspect, the knowledge object, stored in a knowledge system 102, may be retrieved to draw inferences and thereby provided to the SEAL framework in order to assist a user in taking necessary decisions based on the inferences drawn from the knowledge object. To retrieve the knowledge object, the knowledge system 102 may employ the knowledge access module 212, the knowledge processing module 214, and the knowledge persistence module 216.

At first, the knowledge access module 212 receives a knowledge request, requesting a knowledge object, from the user. In one aspect, the knowledge request may be associated to at least one domain. It may be understood that the knowledge request may be provided by the user in a narrative form, wherein the knowledge request requests information about the opportunity so as to take necessary decisions. Upon receipt of the knowledge request, the knowledge access module 212 generates a structured query based on the knowledge request. In one embodiment, the structured query is generated by using one or more machine learning method including a deep learning network pre-trained for the knowledge request and a structured query language type. Examples of the structured query may include, but not limited to, Structured Query Language (SQL) and SPARQL. In one embodiment, upon generation, the structured query may be pre-processed (for example, check if well-formed in accordance with the rules pertaining to the SQL or SPARQL) before executing on the structured query on the system database 220.

Upon generating the structured query, the knowledge access module 212 splits the structured query into one or more sub queries. In one aspect, the structured query may be split based on the at least one domain and metadata associated to the at least one domain. In one aspect, the metadata indicates one or more sub sections associated to the at least one domain. In one embodiment, each sub query may be assigned with an actor responsible for fetching at least one knowledge object, from the system database 220, relevant for a sub query. In one aspect, the actor is a mathematical model for performing computations in order to retrieve results pertaining to the sub query.

Post splitting of the structured query, the knowledge access module 212 enables the actor to fetch one or more knowledge objects for each sub query upon executing the one or more sub queries. It may be understood that each sub query may retrieve the knowledge objects from multiple databases. Therefore, the one or more sub queries may be executed, in parallel or in a distributed manner, over the multiple databases present in the Distributed Computing Environment (DCE). It may be noted that the execution of the one or more sub queries over the multiple database may decrease the processing time spent for retrieving the knowledge objects.

In one embodiment, the knowledge access module 212 fetches the one or more knowledge objects upon referring to the one or more ontologies stored in the system database 220. Examples of the one or more ontologies comprises the cognitive decision-making process ontology 222, the perceptual system ontology 224, the domain opportunity ontology 226, the domain knowledge ontology 228, and the human interaction system ontology 230. The one or more ontologies may comprise a set of predefined rules facilitating fetching of a knowledge object relevant for a sub query. In one embodiment, the set of predefined rules comprises relationship among domains and a set of scenarios indicating a change in the relationship among the domains over a period of time In other words, the set of predefined rules comprises describing relationships among domains and meta-rules about basic rules and so on. For example, the rules may be about a merchandize hierarchy and its evolution. It may be noted that SKU's are organized in a merchandize hierarchy by introducing categories and sub-categories. The set of predefined rules may indicate how categories are related to each other with in a hierarchy and how product SKU's are related to the categories. In one aspect, category membership may be implicit determined by the truth of a Boolean expression over one or more attributes of the SKUs or membership property may be explicitly captured as fact in the ontologies. The set of predefined rules may further indicate the set of scenarios under which the categories and their memberships may change over period of time. A sub-query pertaining to changes in merchandize hierarchy may be directed to the ontologies about categories and their evolution whereas a sub query about sales performance of a store may be directed to another ontology which relates sales data, products and store concepts to sales performance metrics and the associated aggregation and analytics methods.

The description of the various ontologies is described in the table 1.

| Ontology (Knowledge Base) | Description |
| --- | --- |
| Cognitive Decision-Making Process Ontology 222 | This ontology contains knowledge used to derive the overall SEAL process. |
| Perceptual System Ontology 224 | This ontology contains knowledge about data sources, connections, data streams, and knowledge required to create opportunity input data packages. |
| Domain Opportunity Ontology 226 | This ontology contains the specifications of opportunity types and opportunity instances specific to the domain of the business. |
| Domain Knowledge Ontology 228 | This ontology contains miscellaneous knowledge about the domain of the business. |
| Human Interaction System Ontology 230 | This ontology contains knowledge about users, their profiles, and interactions with the knowledge system 102. |

After executing the one or more queries, the knowledge processing module 214 creates an integrated knowledge object for the knowledge request. The knowledge processing module 214 integrates the knowledge request upon integrating the one or more knowledge objects fetched by the one or more sub queries. Subsequent to the creation of the integrated knowledge object, the knowledge processing module 214 stores the integrated knowledge object, along with the one or more ontologies, in a temporary memory (hereinafter referred to as an In-Memory Knowledge Graph) for the user's reference thereby retrieving the knowledge object pertaining to the query. In one embodiment, the knowledge processing module 214 maintains a cache of knowledge objects in the In-Memory Knowledge Graph in order to speed up processing time of the structured query. Thus, in this manner, the knowledge system 102 retrieves the knowledge object relevant for the business opportunity and thereby allowing the user to take necessary decisions for optimizing the business performance.

In order to elucidate the aforementioned methodology of the knowledge access module 212 and the knowledge processing module 214, consider a scenario where a business opportunity (Excess stock) is being sensed and require appropriate attention to manage the Excess stock situation. To take necessary decisions, a store manager of a warehouse requests a list of Stock Keeping Units having Maximum Retail Price (MRP) greater than '$50' and have been kept in the warehouse for more than '1' month. Based on the request, the knowledge access module 212 generates a structured query (SQL query) based on the knowledge request. In one aspect, the SQL query for the above request is below.

Select SKU_name from [Table(s), Database] where MRP>'$50' and duration>'1'

Please note that the above SQL query is only for representation purpose. The actual SQL query generated may be different then the query as illustrated above. It may be noted that the 'SKU_name' indicates "Name of SKU", Table, Database indicate a Database storing a plurality of knowledge objects.

Subsequently, the knowledge access module 212 splits the structured query into one or more sub queries, wherein the structured query is split based on the domain and metadata associated to the domain. Since the domain for the above structured query is related to 'Stock Management', the knowledge access module 212 splits the structured query into two sub queries based on 'MRP' and 'Duration'. Upon splitting the structured query, the knowledge access module 212 assigns an actor responsible for fetching at least one knowledge object relevant for each sub query. Each actor may then refer to the ontologies in order to retrieve the knowledge object relevant to the sub query.

For example, Actor '$A_1$' refers to the Domain Knowledge Ontology 228 to retrieve the knowledge object '$KO_1$' pertaining to 'Finance' domain. Similarly, Actor '$A_2$' refers to the Domain Knowledge Ontology 228 to retrieve the knowledge object '$KO_2$' pertaining to 'Stock Management'. Both '$KO_1$' and '$KO_2$' are then integrated to create an integrated knowledge object (IKO) for the store manager's reference. Thus, in this manner, the knowledge system 102 retrieves the knowledge object (IKO) relevant for the business opportunity (Excess stock) and thereby allowing the user to take necessary decisions for managing the excess stock situation.

In an exemplary embodiment of the invention, the knowledge system 102 further comprises the knowledge persistence module 216 to hide an underlying storage/database technology. Since the aforementioned methodology may be implemented in the DCE, it may be understood that the knowledge system may be communicatively coupled with varying databases having distinct protocols. Therefore, it becomes utmost import to hide the underlying storage/database technology so that any database may be used with the knowledge system 102 for retrieving the knowledge object. By hiding, the knowledge persistence module 216 further facilitates to migrate the data to an existing database to other database by simple changing a network path from the existing database to a new database.

In addition to the above, the knowledge persistence module 216 provides a virtualized view of the knowledge object to the user on a Graphical User Interface (GUI). The knowledge persistence module 216 further provides a uniform and consistent APIs for all kinds of knowledge objects for the knowledge access module 212. In one aspect, the knowledge persistence module 216 further facilitates serialization and des-serialization capabilities as the knowledge access module 212 retrieves the knowledge object upon referring to the one or more ontologies.

Figure 3:
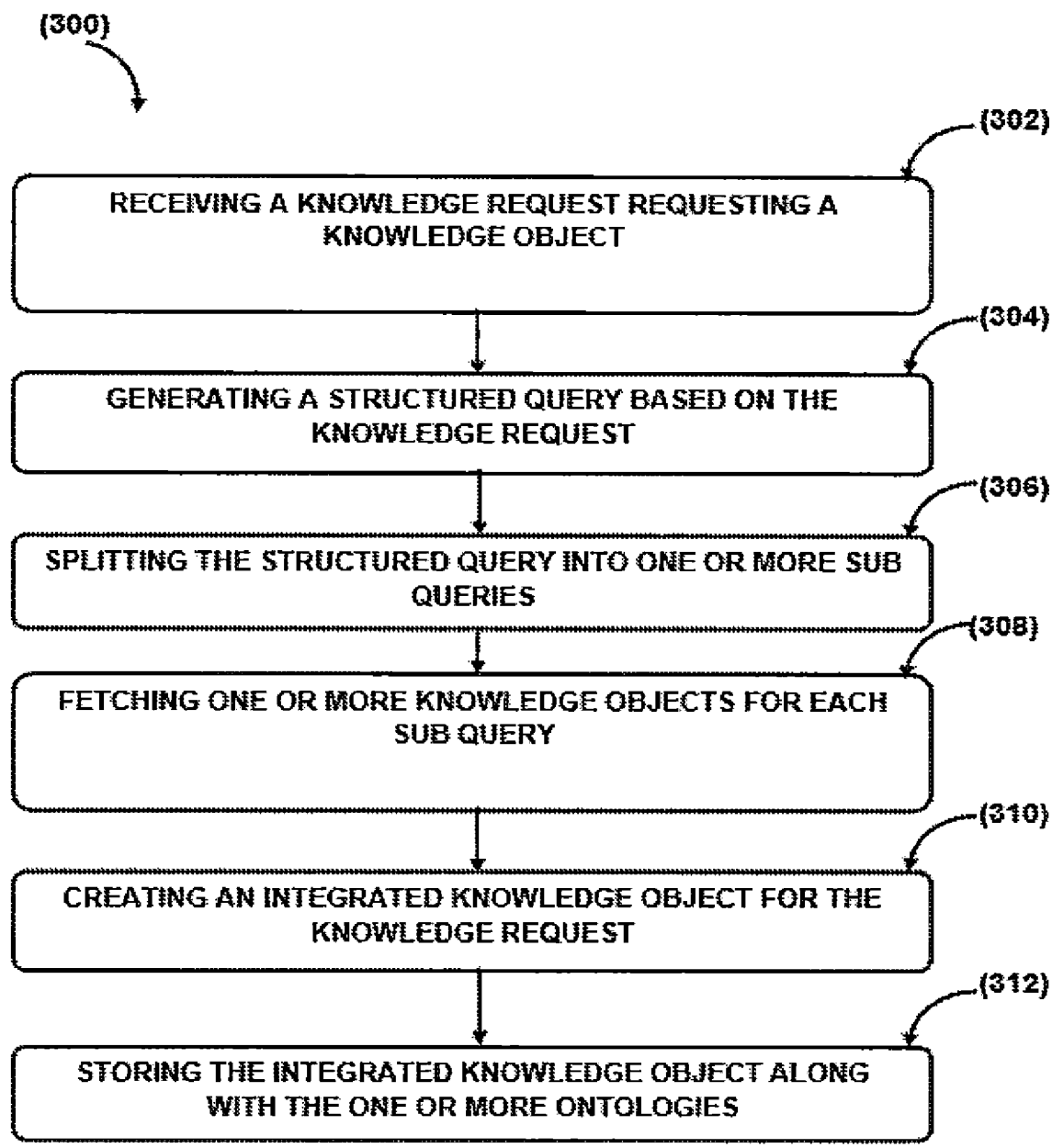
FIG. 3 illustrates a method for retrieving the knowledge object in the decision-making process framework is shown, in accordance with an embodiment of the present disclosure.

Referring now to FIG. 3, a method 300 for retrieving a knowledge object, pertaining to a query, in a cognitive decision-making process is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the knowledge system 102.

At block 302, a knowledge request requesting a knowledge object may be received from a user. In one aspect, the knowledge request may be associated to at least one domain. In one implementation, the knowledge request may be received by the knowledge access module 212.

At block 304, a structured query may be generated based on the knowledge request. In one implementation, the structured query may be generated by the knowledge access module 212.

At block 306, the structured query may be split into one or more sub queries. In one aspect, the structured query may be split based on the at least one domain and metadata associated to the at least one domain. In one implementation, the structured query may be split by the knowledge access module 212.

At block 308, one or more knowledge objects may be fetched for each sub query upon executing the one or more sub queries on a system database storing a plurality of knowledge objects. In one aspect, the one or more knowledge objects may be fetched upon referring to one or more ontologies stored in the system database. In one implementation, the one or more knowledge objects may be fetched by the knowledge access module 212.

At block 310, an integrated knowledge object may be created for the knowledge request upon integrating the one or more knowledge objects fetched by the one or more sub queries. In one implementation, the integrated knowledge object may be created by the knowledge processing module 214.

At block 312, the integrated knowledge object, along with the one or more ontologies, may be stored in a temporary memory for the user's reference thereby retrieving the knowledge object pertaining to the query. In one implementation, the integrated knowledge object, along with the one or more ontologies, may be stored by the knowledge processing module 214.

Thus, in this manner, the knowledge system 102 for retrieving the knowledge object in a cognitive decision-making process. Although implementations of a method and system for retrieving the knowledge object have been described in language specific to structural features and/or methods, it is to be understood that the implementations and/or embodiments are not necessarily limited to the specific features or methods described.

The invention claimed is:

1. A method for retrieving a knowledge object, pertaining to a query, in a cognitive decision-making process, the method comprising:

receiving, by a processor, a knowledge request requesting a knowledge object, wherein the knowledge request is associated to at least one domain, and wherein the knowledge request is received from a user in a narrative form;

generating, by the processor, a structured query based on the knowledge request, wherein the structured query is generated by using one or more machine learning methods including a deep learning network pre-trained for the knowledge request and a structured query language type;

splitting, by the processor, the structured query into one or more sub queries, wherein the structured query is split based on the at least one domain and metadata associated to the at least one domain;

assigning, by the processor, an actor for fetching one or more knowledge objects for each sub query upon executing the one or more sub queries on multiple databases storing a plurality of knowledge objects, wherein the one or more knowledge objects are fetched upon referring to one or more ontologies stored in the multiple databases, and wherein the actor indicates a mathematical model for performing computations, and wherein the one or more sub queries may be executed, in parallel or in a distributed manner, over the multiple databases present in a Distributed Computing Environment (DCE);

creating, by the processor, an integrated knowledge object for the knowledge request upon integrating the one or more knowledge objects fetched by the one or more sub queries;

storing, by the processor, the integrated knowledge object, along with the one or more ontologies, in a temporary memory for the user's reference thereby retrieving the knowledge object pertaining to the query; and generating, by the processor, a virtualized view of the integrated knowledge object by hiding an underlying storage or a database technology, wherein the virtualized view of the integrated knowledge object is accessed by the user through a Graphical User interface.

2. The method of claim 1, wherein the structured query is generated as one of a Structured Query Language (SQL) and SPARQL.

3. The method of claim 1, wherein the metadata indicates one or more sub sections associated to the at least one domain.

4. The method of claim 1, wherein the one or more ontologies comprises a set of predefined rules facilitating fetching of a knowledge object relevant for a sub query, and wherein the set of predefined rules comprises relationship among domains and a set of scenarios indicating a change in the relationship among the domains over a period of time.

5. The method of claim 1, wherein each sub query is assigned with an actor responsible for fetching at least one knowledge object, from the system database, relevant for a sub query and thereby storing the at least one knowledge object in the temporary memory.

6. A knowledge system for retrieving a knowledge object, pertaining to a query, in a cognitive decision-making process, the knowledge system comprising:

a processor; and a memory coupled to the processor, wherein the processor is capable of executing a plurality of modules stored in the memory, and wherein the plurality of modules comprising a knowledge access module for receiving a knowledge request requesting a knowledge object, wherein the knowledge request is associated to at least one domain, and wherein the knowledge request is received from a user in a narrative form, generating a structured query based on the knowledge request, wherein the structured query is generated by using one or more machine learning methods including a deep learning network pre-trained for the knowledge request and a structured query language type, splitting the structured query into one or more sub queries, wherein the structured query is split based on the at least one domain and metadata associated to the at least one domain, assigning an actor for fetching one or more knowledge objects for each sub query upon executing the one or more sub queries on multiple databases storing a plurality of knowledge objects, wherein the one or more knowledge objects are fetched upon referring to one or more ontologies stored in the multiple databases, and wherein the actor indicates a mathematical model for performing computations, and wherein the one or more sub queries may be executed, in parallel or in a distributed manner, over the multiple databases present in a Distributed Computing Environment (DCE); and a knowledge processing module for creating an integrated knowledge object for the knowledge request upon integrating the one or more knowledge objects fetched by the one or more sub queries, and storing the integrated knowledge object, along with the one or more ontologies, in a temporary memory for the user's reference thereby retrieving the knowledge object pertaining to the query; and a knowledge persistence module for generating a virtualized view of the integrated knowledge object by hiding an underlying storage or a database technology, wherein the virtualized view of the integrated knowledge object is accessed by the user through a Graphical User Interface.

7. The knowledge system of claim 6, wherein the structured query is generated as one of a Structured Query Language (SQL) and SPARQL.

8. The knowledge system of claim 6, wherein the metadata indicates one or more sub sections associated to the at least one domain.

9. The knowledge system of claim 6, wherein the one or more ontologies comprises a set of predefined rules facilitating fetching of a knowledge object relevant for a sub query, and wherein the set of predefined rules comprises relationship among domains and a set of scenarios indicating a change in the relationship among the domains over a period of time.

10. The knowledge system of claim 6, wherein each sub query is assigned with an actor responsible for fetching at least one knowledge object, from the system database, relevant for a sub query and thereby storing the at least one knowledge object in the temporary memory.

11. A non-transitory computer readable medium embodying a program executable in a computing device for retrieving a knowledge object, pertaining to a query, in a cognitive decision-making process, the program comprising a program code:
- a program code for receiving a knowledge request requesting a knowledge object, wherein the knowledge request is associated to at least one domain, and wherein the knowledge request is received from a user in a narrative form;
- a program code for generating a structured query based on the knowledge request, wherein the structured query is generated by using one or more machine learning methods including a deep learning network pre-trained for the knowledge request and a structured query language type;
- a program code for splitting the structured query into one or more sub queries, wherein the structured query is split based on the at least one domain and metadata associated to the at least one domain;
- a program code for assigning an actor for fetching one or more knowledge objects for each sub query upon executing the one or more sub queries on multiple databases storing a plurality of knowledge objects, wherein the one or more knowledge objects are fetched upon referring to one or more ontologies stored in the multiple databases, and wherein the actor indicates a mathematical model for performing computations, and wherein the one or more sub queries may be executed, in parallel or in a distributed manner, over the multiple databases present in a Distributed Computing Environment (DCE);
- a program code for creating an integrated knowledge object for the knowledge request upon integrating the one or more knowledge objects fetched by the one or more sub queries;
- a program code for storing the integrated knowledge object, along with the one or more ontologies, in a temporary memory for the user's reference thereby retrieving the knowledge object pertaining to the query; and
- a program code for generating a virtualized view of the integrated knowledge object by hiding an underlying storage or a database technology, wherein the virtualized view of the integrated knowledge object is accessed by the user through a Graphical User Interface.

* * * * *